United States Patent [19]
Dilgren et al.

[11] Patent Number: 4,643,256
[45] Date of Patent: Feb. 17, 1987

[54] STEAM-FOAMING SURFACTANT MIXTURES WHICH ARE TOLERANT OF DIVALENT IONS

[75] Inventors: Richard E. Dilgren, Houston; Kenneth B. Owens, Spring, both of Tex.

[73] Assignee: Shell Oil Company, Houston, Tex.

[21] Appl. No.: 712,932

[22] Filed: Mar. 18, 1985

[51] Int. Cl.$^4$ ............................................. E21B 43/24
[52] U.S. Cl. .................................... 166/303; 166/272; 166/309
[58] Field of Search ........................ 166/272, 303, 309

[56] References Cited

U.S. PATENT DOCUMENTS

| | | | |
|---|---|---|---|
| 4,175,618 | 11/1979 | Wu et al. | 166/272 X |
| 4,393,937 | 7/1983 | Dilgren et al. | 166/272 |
| 4,532,993 | 8/1985 | Dilgren et al. | 166/309 X |

Primary Examiner—Stephen J. Novosad
Assistant Examiner—Thomas J. Odar

[57] ABSTRACT

In a steam-foam-displacement of oil within a reservoir formation having a significant ion-exchange capacity for releasing multivalent cations, the rate of the steam foam propagation is increased by injecting a mixture of steam and a steam-foaming surfactant mixture comprising an independently effective steam-foaming sulfonate surfactant mixed with a lesser amount of an alkyl or alkylarylpolyalkoxyalkylene sulfonate cosurfactant.

5 Claims, 1 Drawing Figure

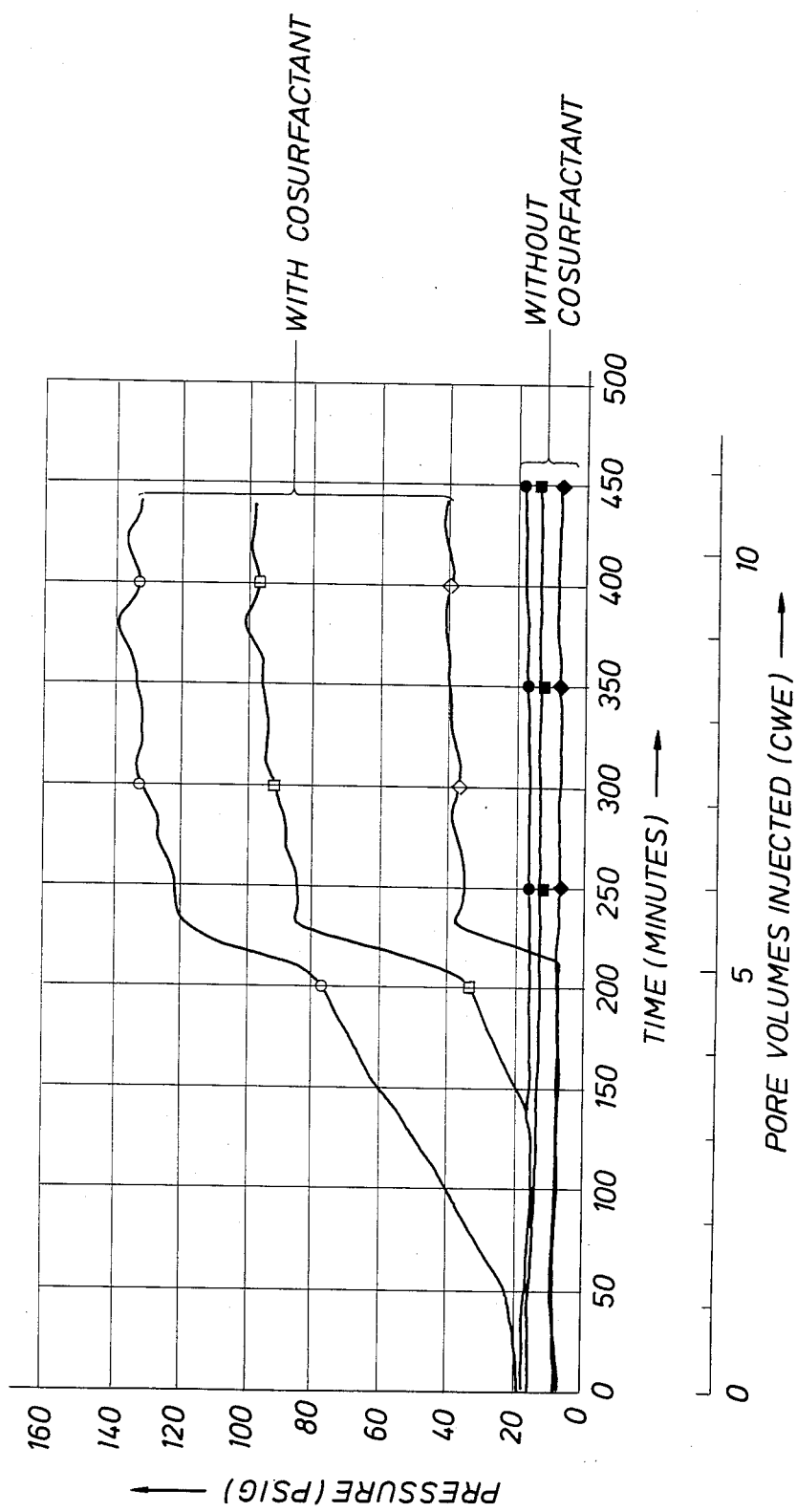

STEAM-FOAMING SURFACTANT MIXTURES WHICH ARE TOLERANT OF DIVALENT IONS

BACKGROUND OF THE INVENTION

This invention relates to displacing oil within a subterranean reservoir by injecting steam and steam-foaming surfactant into the reservoir. More particularly, it relates to forming a steam foaming surfactant mixture which is efficient even in the presence of polyvalent metal ions, such as divalent cations.

The present invention provides an improvement for steam drive or steam soak processes such as those described in U.S. Pat. No. 4,086,964 by R. E. Dilgren, G. J. Hirasaki, H. J. Hill, and D. G. Whitten, which describes a steam-channel-expanding steam foam drive process in which a steam-foam-forming mixture containing steam and a steam-foaming surfactant is injected into and displaced through a steam channel extending between injection and production locations, or U.S. Pat. No. 4,393,937 by R. E. Dilgren and K. B. Owens, which describes a cyclic or continuous steam foam drive process for displacing oil within a subterranean reservoir using steam and a steam-foaming surfactant which consists essentially of an olefin sulfonate surfactant. In general, those processes are efficient, but the propagation of the steam foam may be delayed where the reservoir rocks tend to exchange a significant amount of divalent ions for monovalent ions contained in a solution being displaced through the reservoir. The disclosures of those patents are incorporated herein by reference.

In a process for displacing oil within a subterranean reservoir by injecting a mixture of steam and steam-foaming surfactant, an efficient transport of the surfactant through the reservoir is important. The rate at which foam moves through the reservoir cannot exceed the rate at which that surfactant is transported.

Many subterranean reservoirs have an ion-exchange capacity which is sufficient to impede the transport of a steam-foaming surfactant through the reservoir. Such an ion-exchange is due to a mechanism by which monovalent ions in an injected surfactant solution (such as the aqueous phase of a mixture pf steam and steam-foaming surfactant) displace multivalent cations from the clays and the like ion-exchange sites on the reservoir rocks. This exchange results in a buildup of the multivalent cation content in the injected surfactant solution.

Of all the mechanisms affecting the surfactant transport in a steam foam process, ion-exchange is one of the most critical mechanisms. Other mechanisms including partitioning, precipitating, and possibly spreading behavior of the oil and the gas/aqueous interface, are directly related to the multivalent cation concentration of the aqueous liquid phase.

In the presence of oil, a buildup of multivalent ions, such as one due to an ion-exchange, increases the partitioning of the surfactant into the oleic phase. This is due to conversion of normal surfactant micelles to inverted micelles which are soluble in oil. The surfactant transport is thus retarded due to the partitioning of surfactant into bypassed droplets of oil.

U.S. Pat. No. 4,269,271 describes a surfactant-containing emulsion-flooding oil recovery process which is effective for use in salinities higher than about 30,000 ppm total dissolved solids and/or concentrations of divalent ions greater than about 2,000 ppm. That process uses a mixture of at least two surfactants; (a) an alkylpolyalkoxyalkylene or alkylarylpolyalkoxyalkylene sulfonate surfactant and (b) a nonionic surfactant. U.S. Pat. No. 4,465,602 describes a surfactant-containing aqueous flood containing an alkylarylpolyalkoxyalkylene sulfonate surfactant.

SUMMARY OF THE INVENTION

The present invention relates to a process in which oil is displaced by injecting steam and steam-foaming surfactant into a reservoir having an ion-exchange capacity capable of reducing the rate of propagation of the steam-foaming surfactant through the reservoir due to a tendency for polyvalent cations from ion-exchange sites within the reservoir to become exchanged for monovalent cations dissolved in the injected fluid. The present invention provides an increased rate of steam-foaming surfactant propagation by formulating and injecting a steam-foaming surfactant mixture consisting essentially of (a) a predominant amount of a sulfonate surfactant which, by itself and in the absence of polyvalent cations, is capable of yielding a steam foam having a mobility significantly lower than that of steam alone and (b) a lesser amount of alkylpolyalkoxyalkylene or alkylarylpolyalkoxyalkylene sulfonate surfactant which is effective for causing the steam-foaming mixture to yield significant steam mobility reduction in the presence of polyvalent cations.

BRIEF DESCRIPTION OF THE DRAWINGS

The drawing shows a graph of pressures at different locations during injections of steam-foam-forming mixtures into and through sand packs.

DESCRIPTION OF THE INVENTION

The present invention is, at least in part, premised on the following discovery. Although known types of sulfonate surfactants that are generally efficient steam-foamers are inefficient in the presence of polyvalent cations—and although known types of substituted polyalkoxyalkylene sulfonate surfactants that are generally efficient emulsion-formers in the presence of polyvalent cations are ineffective as steam-foamers in the presence of such polyvalent cations—the presently specified mixture of such generally efficient surfactants and substituted polyalkoxyalkylene sulfonate surfactants are effective steam-foamers in the presence of such polyvalent cations.

Data obtained in field testing steam-foam displacements of oil have indicated that an exchange of multivalent cations for monovalent cations within a reservoir can cause a significant proportion of multivalent cations to become dissolved in the aqueous liquid phase of the fluid being displaced through the reservoir.

Sand pack tests of the type described in the '964 and '937 patents mentioned above, have been conducted for determining relative efficiencies of various steam-foaming surfactants in the presence and absence of multivalent cations. Such tests used vertical packs of Ottawa sand provided with means for measuring pressures at the inlet and at two points within the packs. The steam-foam-forming mixtures being tested were displaced through the packs at substantially constant mass rates until substantially steady-state pressures were obtained at the inlet and internal taps. The steady-state pressures at the internal taps were used, with equations for isothermal single-phase flow of an ideal gas, to calculate effective mobility or effective permeability to both the steam by itself and the steam mixed with the foam-forming surfactant. The effective permeability to steam mixed with surfactant divided by that of steam only is termed a permeability reduction factor. The smaller this factor, the stronger the steam foam and the lower the mobility of the steam-foam-forming mixture within a permeable porous medium.

Control Experiment (No Cosurfactant)

A base case experiment was run in duplicate to determine the detrimental effect of 2000 ppm $Ca^{++}$ on the steam foam prepared from 0.5% Siponate A-168 (an alpha-olefin sulfonate surfactant available from Alcolac Inc.) and 0.9% NaCl. Results are summarized in the upper portion of Table 1 and the lower set of pressure histories in the drawing. Calcium ion prevented development of a foam even after over 10 pore volumes of cold water equivalent (CWE) of steam-foam-forming fluid injection, as is reflected in the high permeability reduction factor of 1.4±0.1 and the lack of pressure increase during the experiments. Similar experiments in the absence of calcium ion have consistently yielded a permeability reduction factor of 0.041±0.002.

In the present experiments, a reduced concentration $c/c_o$ (ratio of produced to injected concentration) showed that only 5 percent of injected surfactant survived. The remaining 95 percent of surfactant was made unavailable for foam development through (a) precipitation, (b) partitioning into residual oil, or (c) retention as a calcium ion/surfactant aggregate within the porous medium. Adsorption is a negligible mechanism of loss on Ottawa sand. Interestingly, the calcium ion and surfactant which disappears within the sand pack do so in a one-to-one mole ratio (see "Missing" column in Table 1). This indicates calcium monosulfonate retention; for calcium disulfonate formation, the ratio would be 0.5.

Experiment with Cosurfactant

An experiment, performed in triplicate, was carried out in which one-fifth of the primary surfactant, Siponate A-168, was replaced by the cosurfactant "NES-25" (i.e., an alkylpolyalkoxyalkylene sulfonate containing an alkyl group of about 9–11 carbon atoms, an ethylene group and an average of about 2.5 ethyleneoxide groups per molecule). Total surfactant concentration was therefore the same as in the control experiment. Calcium ion and NaCl concentrations were also the same as in the control experiment. Results are summarized in the lower portion of Table 1 and the upper set of curves of pressure histories shown in the drawing. The inclusion of that cosurfactant conferred a respectable measure of divalent ion tolerance as indicated by the average permeability reduction factor of 0.051±0.011 and the development of significant pressure gradients.

The reduced concentration $c/c_o$ for the cosurfactant experiments showed that approximately 45 percent of the injected surfactant survived, was able to make a steam foam, and was produced. Assuming that all of the cosurfactant survived, since only 20 percent of total injected surfactant was cosurfactant, apparently an equal or slightly greater concentration of primary surfactant was "protected". Once again, the surfactant retained in the sand pack was retained as the calcium monosulfonate.

TABLE 1

Effect of Cosurfactant on Siponate A-168 Steam Foam in the Presence of $Ca^{++}$

| Experiment Number | Surfactant System (a,b) | Permeability Reduction Factor | $c/c_o$ for $RSO_3 Na$ (b) | $c/c_o$ for $Ca^{++}$ (b) | "Missing" $[Ca^{++}]/[RSO_3 Na]$ mole/mole (b) |
|---|---|---|---|---|---|
| 1801-120A | 0.5% Siponate A-168<br>0.9% NaCl<br>2000 ppm $Ca^{++}$ | 1.5 | — | — | — |
| 1801-120B | 0.5% Siponate A-168<br>0.9% NaCl<br>2000 ppm $Ca^{++}$ | 1.3<br>Avg. 1.4 ± 0.1 | 0.05 ± 0.007 | 0.79 ± 0.02 | 0.9 ± 0.1 |
| 1801-134A | 0.4% Siponate A-168<br>0.1% NES-25<br>0.9% NaCl<br>2000 ppm $Ca^{++}$ | 0.064 | 0.43 ± 0.08 | — | — |
| 1801-134B | 0.4% Siponate A-168<br>0.1% NES-25<br>0.9% NaCl<br>2000 ppm $Ca^{++}$ | 0.055 | 0.44 ± 0.05 | 0.83 ± 0.02 | 1.2 ± 0.2 |
| 1801-134C | 0.4% Siponate A-168<br>0.1% NES-25<br>0.9% NaCl<br>2000 ppm $Ca^{++}$ | 0.034<br>Avg. 0.051 ± 0.011 | 0.50 ± 0.07 | 0.83 ± 0.02 | 1.3 ± 0.3 |

(a) Steam foam prepared from 50% quality steam; mole fraction $N_2$ in gas phase = 0.006.
(b) Concentrations refer to the liquid water phase within the sand pack.

By means of comparable experiments, it was determined that the alkylene sulfonate surfactant NES-25 at a concentration of 0.5% and in the presence of 0.9% sodium chloride and 2000 ppm calcium ion does not, by itself, make a steam foam.

Suitable Compositions and Techniques

In general, the present steam-foaming surfactant mixture comprises a predominant amount of an individually effective steam-foaming sulfonate surfactant. As used herein, "an individually effective steam-foaming sulfonate surfactant" is one which, by itself and in the absence of polyvalent cations, is capable of generating a steam foam having a permeability reduction factor which is significantly reduced. An example comprises such a surfactant having such a factor of about 0.18. An individually effective steam-foaming sulfonate surfactant is mixed with a lesser amount of an alkyl or alkylarylpolyalkoxyalkylene sulfonate surfactant capable of significantly increasing the capability of the mixture to form a steam foam of significantly reduced mobility in the presence of a significant proportion of polyvalent cation. Generally suitable steam-foaming sulfonate surfactants which are individually effective, comprise substantially any alkylaryl sulfonate or olefin sulfonate surfactants which are capable of producing a steam foam having a mobility factor of less than about 0.18, such as the individually effective steam-foaming sulfonate surfactants exemplified in U.S. Pat. Nos. 4,086,964 and 4,393,937. The alpha-olefin sulfonate surfactants such as Enorde ® AOS 1618 (an alpha-olefin sulfonate surfactant available from Shell Chemical Company) or Siponate A-168 are particularly preferred.

Generally suitable alkyl or alkylarylpolyalkoxyalkylene sulfonates comprise the water-soluble sulfonates having formulas of the types described in U.S. Pat. Nos. 4,269,271 and 4,465,602. Such substituted alkylene sulfonates containing about 8 to 30 carbon atoms and preferably about 12 to 20 carbon atoms are particularly suitable. Especially suitable are such alkylpolyalkoxyalkylene sulfonates containing about 2 to 10 ethoxy groups, or mixtures of ethoxy and propoxy groups, and an alkylene group containing about 2 or 3 carbon atoms. Such sulfonate surfactants are also useful where the alkylene group is an hydroxy-substituted group, such as an hydroxy-propyl group. What is particularly important is that the substituted-alkylene sulfonate surfactant being used be capable of significantly increasing the capability of a mixture of that surfactant with a larger amount of the individually effective sulfonate surfactant with which the alkylene sulfonate surfactant is being used in the presence of the divalent cations apt to be encountered in the reservoir being treated.

The proportion of alkylene sulfonate surfactant in the present steam-foaming surfactant mixture is preferably less than that of the individually effective steam-foaming surfactant. The ratio of alkylene sulfonate surfactant concentration to the individually effective steam-foaming surfactant concentration is preferably about 0.05 to 0.50.

The present steam-foaming surfactant mixtures are preferably used in steam-foam-forming mixtures containing steam, noncondensible gas and electrolyte as well as the surfactant mixtures. The proportions of the components in such mixtures are preferably tailored with respect to the properties of the reservoir and reservoir oil to be treated. Particularly suitable correlations and oil recovery techniques are described in more detail in U.S. Pat. Nos. 4,086,964 and 4,393,937.

What is claimed is:

1. In a process in which oil is displaced by injecting steam and steam-foaming surfactant into a subterranean reservoir having an ion-exchange capacity capable of reducing the rate of propagation of the surfactant through the reservoir due to a tendency for polyvalent cations from ion-exchange sites within the reservoir to be exchanged for monovalent cations dissolved in the injected fluids, an improvement for enhancing the rate of surfactant propagation which comprises:

injecting a reservoir-tailored steam-foaming surfactant mixture consisting essentially of (a) a predominant amount of a sulfonate surfactant which, by itself in the presence of the reservoir oil and in the absence of polyvalent cations, is capable of yielding a steam foam of significantly reduced mobility, and (b) a lesser amount of an alkylpolyalkoxyalkylene or an alkylarylpolyalkoxyalkylene sulfonate surfactant which is effective for causing the steam-foaming surfactant mixture to be capable of yielding a steam foam of significantly reduced mobility in the presence of the reservoir oil and the ion-exchangeable cations on the reservoir rocks.

2. The process of claim 1 in which said alkylene sulfonate surfactant is an alkylpolyalkoxyalkylene sulfonate surfactant.

3. The process of claim 2 in which the alkyl group of said alkylene sulfonate surfactant contains about 9 to 11 carbon atoms.

4. The process of claim 1 in which the independently effective sulfonate surfactant is an alpha-olefin sulfonate surfactant derived from olefins containing about 15 to 20 carbon atoms.

5. The process of claim 4 in which the alkylene group of said alkylene sulfonate surfactant contains about 2 to 3 carbon atoms and that surfactant contains an average of about 2 to 10 polyethoxy or polypropoxy groups.

* * * * *